United States Patent [19]

Graton et al.

[11] Patent Number: 5,076,409
[45] Date of Patent: Dec. 31, 1991

[54] LOW INERTIA FRICTION CLUTCH, IN PARTICULAR FOR AN AUTOMOTIVE VEHICLE

[75] Inventors: Michel Graton, Paris; Fabrice Tauvron, Creteil, both of France

[73] Assignee: Valeo, Paris, France

[21] Appl. No.: 584,720

[22] Filed: Sep. 19, 1990

[30] Foreign Application Priority Data

Sep. 22, 1989 [FR] France .............................. 89 12466

[51] Int. Cl.⁵ ...................... F16D 13/68; F16D 13/72
[52] U.S. Cl. ............................. 192/107 C; 192/113 A
[58] Field of Search ........................ 192/107 C, 113 A

[56] References Cited

U.S. PATENT DOCUMENTS 1,862,991 6/1932 Vargha .
2,253,316 8/1941 Armitage .

FOREIGN PATENT DOCUMENTS 2255499 7/1975 France .
2600732 12/1987 France .
270464 5/1927 United Kingdom ........... 192/113 A
566572 1/1945 United Kingdom ........... 192/113 A
2039637 8/1980 United Kingdom .
2191831 12/1987 United Kingdom .

*Primary Examiner*—Rodney H. Bonck
*Attorney, Agent, or Firm*—Charles A. Brown

[57] ABSTRACT

The present invention relates to a friction clutch of the kind having two friction pads coaxial with each other and adhesively bonded or moulded on to annular supports which are arranged to face each other in the axial direction.

In accordance with the invention, a progression element is interposed between the two friction pads, this progression element comprising a plurality of protuberances of resilient material, some at least of which are secured to the supports, with the protuberances delimiting channels between them and having a surface at their outer periphery which is of greater circumferential length than the surface with which they are provided at their inner periphery.

5 Claims, 1 Drawing Sheet

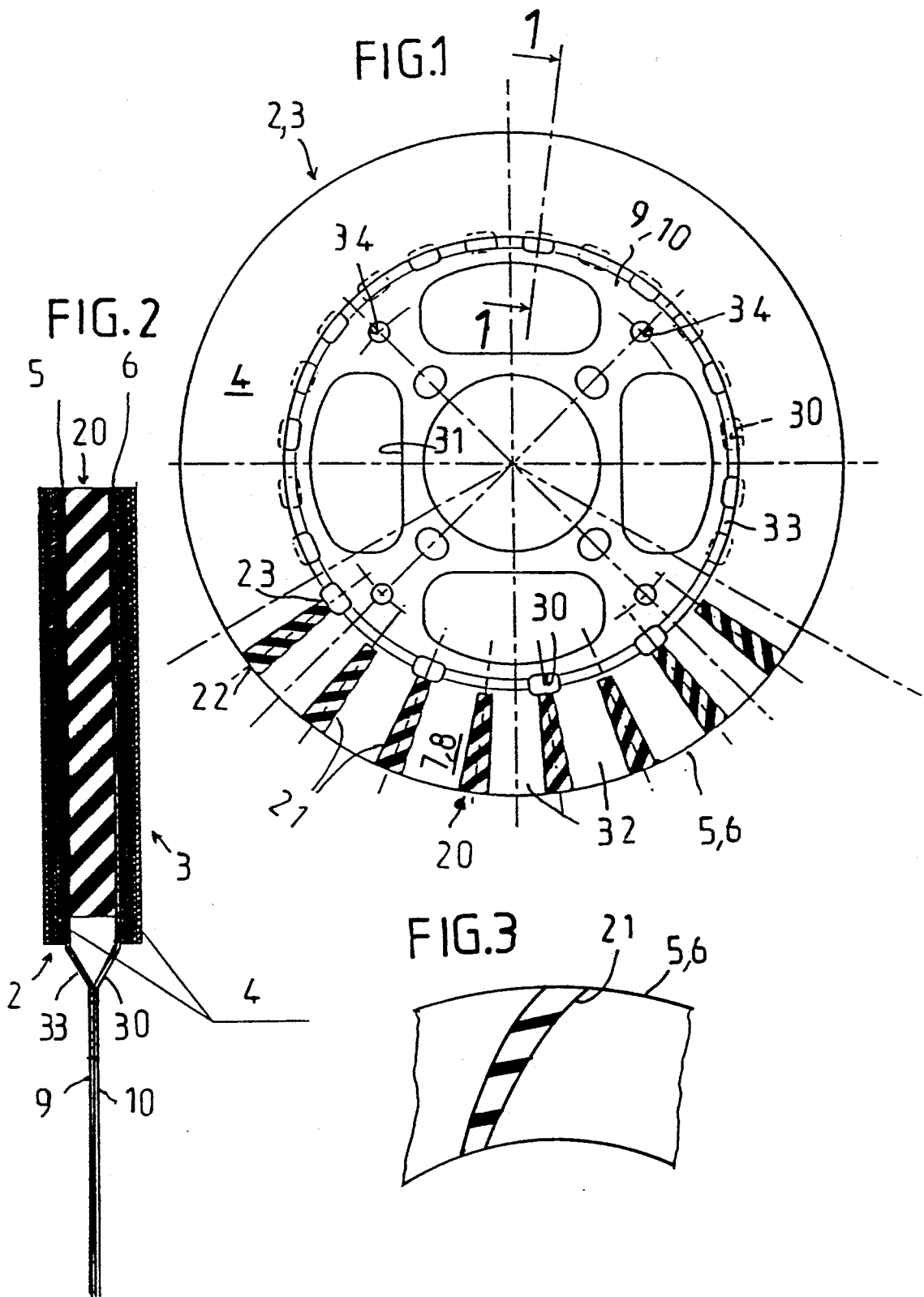

LOW INERTIA FRICTION CLUTCH, IN PARTICULAR FOR AN AUTOMOTIVE VEHICLE

FIELD OF THE INVENTION

This invention relates to a friction clutch, in particular for an automotive vehicle, which is of the kind in which two coaxial friction pads, spaced axially away from each other, are adhesively bonded or moulded on to annular supports which face each other in the axial direction and which are provided with radial extension portions which are directed radially inwards, and through which the supports are brought into axial juxtaposition with each other by means of at least one oblique folded portion formed in one of the said extension portions.

BACKGROUND OF THE INVENTION

Such a friction clutch is described in the French published patent application No. FR 2 600 732A, which discloses an arrangement having at least one metallic progression element constituting a spring, which is interposed between the two friction pads and which in some embodiments is secured to at least one of the supports. In addition, in order to avoid conical deformation of the two friction pads, the supports include radial arms which extend outwardly, with each arm of a support terminating in a hook which cooperates with a similar hook arranged facing it and formed on an arm of the other support.

An arrangement of the above kind enables a low inertia friction clutch to be constructed, in which, in particular, the thickness of the friction pads is reduced, while giving good progression during the operation of engaging or disengaging the clutch. However, it involves a very large number of bent components, and is relatively complex. In addition, in this type of construction, the stiffness varies, from the circumferential edge of the friction pads that is of greater diameter to their circumferential edge of lesser diameter, in such a way that in service, a heating effect that is as regular as is desirable, and a degree of wear which is as regular as desirable, are not obtained in the friction pads.

DISCUSSION OF THE INVENTION

An object of the present invention is to overcome these drawbacks in a simple and economical manner, while preserving the advantage of an arrangement having annular supports.

In accordance with the invention, a friction clutch of the kind defined above is characterised in that the said progression element comprises a plurality of protuberances of resilient material, at least some of which connect the said supports together, the said protuberances defining channels between them and having at their outer periphery a surface of greater circumferential length than the surface formed on their inner periphery.

By virtue of this arrangement, the protuberances are well ventilated, and the stiffness of the friction clutch is able to be made substantially constant from the outer to the inner periphery of its friction pads, with good pressure distribution under load.

The arrangement also allows low density rubber to be used as the material for the protuberances.

The friction clutch is thus able to offer a good progression effect, while under load it adapts well to thermal deformations of the pressure plate and reaction plate of the clutch, so that wear on the friction pads is regularised.

It will be appreciated that the supports are of relatively low thickness, and that they play a part in the progression effect of the friction clutch, while allowing the friction pads to be secured without any need for fastening rivets. This in turn allows low inertia of the clutch to be preserved. In addition, the supports constitute a thermal screen for the protuberances.

It will also be noted that the supports are so configured that they define between them a precise axial space which facilitates the manufacture of the clutch, since the progression element is easily secured to the appropriate support or to the supports, being located in this space. In addition, a readily handled and transportable sub-assembly can be made due to the fact that the progression element of resilient material connects the friction pads together.

It is known from United Kingdom published patent application GB 2 191 831A and from U.S. Pat. No. 2,253,316 to provide a progression element having protuberances; however, in those documents there is only one single support, having lugs such that the latter must be of greater thickness than the supports which are provided in accordance with the present invention for transmitting the same torque. An inferior progression effect is thus obtained. In addition, the friction pads taught in those documents are maintained in position in a less satisfactory way.

The description which follows illustrates particular embodiments of the invention, by way of example only and with reference to the accompanying drawings.

BRIEF DESCRIPTION OF THE DRAWINGS

FIG. 1 is a partial front view, cut away locally in the lower part of the Figure, and showing a friction clutch in accordance with the invention.

FIG. 2 is a view in cross section taken on the line 1—1 in FIG. 1.

FIG. 3 is a partial front view showing a protuberance in the form of a fin.

DESCRIPTION OF PREFERRED EMBODIMENTS OF THE INVENTION

Referring to the drawings, a friction clutch 1, typically for an automotive vehicle, includes two annular and coaxial friction pads 2 and 3, which are rotatable together and secured to a clutch plate (not shown), which is coupled in rotation, for example by riveting, to a hub which is again not shown. Each of the pads 2 and 3 is laid on a respective support 5, 6 to which it is secured.

More precisely, the friction material 4 of each friction pad 2 or 3 is directly moulded or adhesively bonded on to an annular support 5 or 6 respectively. The two supports 5 and 6 are arranged facing each other axially, and in this example they are of metal and of low thickness. In this example they are of metal foils. Each support 5 or 6 includes a flat ring portion 7, 8, from which a radial extension portion 9, 10 projects inwardly towards the centre. In this example, the extension portions 9 and 10 are bent towards each other in such a way as to meet so that they can be secured together, with their inner radial portions being parallel to each other and to the rings 7 and 8. The folded portions, 33, of the supports 5 and 6 are oblique and improve the axial elasticity of the latter.

The friction pads 2 and 3 are spaced apart from each other axially, by virtue of the configuration of their supports 5 and 6 defining a precise axial space. The extension portions 9 and 10 are perforated with holes 34 (FIG. 1), and are secured to a guide ring, not shown, taking advantage of the spacers which join the two guide rings together. For further detail, reference is directed, for example, to FIG. 4 of the above mentioned French published patent application No. FR 2 600 732A.

The friction clutch also includes a progression element 20 constituting a spring, which is interposed between the two friction pads 2 and 3 and which comprises a plurality of protuberances 21 of resilient material, at least some of which are fastened to the two supports 5 and 6. These protuberances 21 together define radial channels 32 between them, and have, at the outer periphery of each protuberance 21, a surface 22 which is of greater circumferential extent than the surface 23 at its inner periphery.

In this example, all of the protuberances 21 are secured simultaneously to the supports 5 and 6, which are thus connected together through the protuberances 21, the latter being moulded or adhesively bonded on to the supports. Even in the event of rupture of the protuberances, it is thus always possible to transmit a torque, so that the vehicle is never immobilised.

The protuberances 21 extend substantially radially, and are of generally trapezoidal cross section: an aperture 30 is formed, in the vicinity of their inner surface 23, in the continuous folded portions 33. Each aperture 30 is wider in the circumferential direction than the associated inner surface 23, and is arranged just inward of the latter in the radial direction. The protuberances 21 are adhesively secured on to the supports 5 and 6, on the side of the latter opposite the friction material 4, and extend generally over the whole radial depth of the friction pads 2 and 3. It will be noted that their radial depth is greater than their width.

The resilient material of which the protuberances 21 are made may be a silicone based rubber which has good resistance to high temperature. This material is preferably one of low density.

As described above, it is possible to create a sub-assembly which can be handled and transported and which comprises the supports 5 and 6 and the progression element 20, with the friction material 4 being subsequently secured on to the outer faces of this sub-assembly.

In a variant, it is possible to assemble the friction pads 2 and 3 partly with their associated supports 5 and 6, and to join these two sub-assemblies together subsequently, by means of the progression element 20, the apertures 30 permitting a moulding operation, and also, eventually, ventilation of the assembly, in particular when the folded portions 33 are continuous. In the present example, each support 5 or 6 is in the form of a disc at its inner periphery, and is provided with windows 31 of oblong shape to accommodate the springs which the friction clutch conventionally includes.

It will be noted that the pads 2 and 3, with their supports 5 and 6, are identical to each other; and that there is an overlap of both the protuberances 21 and the apertures 30.

The windows 31 are arranged facing each other. The circumferential thickness of the resilient protuberances 21 decreases progressively from their outer periphery to their inner periphery.

As will be understood from the foregoing, the protuberances 21 together delimit the open-ended channels 32, so that good ventilation is thus obtained by virtue of the apertures 30, and the protuberances 21 can deform circumferentially. A good axial progression is obtained during re-engagement of the clutch when the pads 2 and 3 are moved towards each other, being gripped progressively between the pressure plate and the reaction plate of the clutch.

In addition, having regard to the trapezoidal shape of the protuberances, the friction clutch has a radial stiffness which is substantially constant from the outer periphery to the inner periphery of the friction pads, so that under load, the pressure can be very evenly distributed and the pads 2 and 3 are able to assume correctly the shape of the pressure plate and reaction plate of the clutch, even when the latter become heated.

During the declutching operation, the friction pads 2 and 3 are freed, and the progression element 20 limits their axial spacing in such a way that the pads 2 and 3 are not in danger of exerting a polishing action on the pressure plate and/or on the reaction plate.

As will be evident from the foregoing and from the drawings, the size and dimensions of the protuberances will be chosen according to the application to which the clutch is to be put.

The present invention is of course not limited to the embodiments described. For example, the inner periphery of the supports may be formed with tongues in the manner described in the above mentioned French published patent application No. FR 2 600 732A. Similarly, instead of extending radially, the protuberances 21 may be inclined in the circumferential direction (FIG. 3) and to define fins with a circumferential width or surface which is, again, larger at their outer periphery than at their inner periphery. These fins become progressively thinner in the inward radial direction.

It will also be clear from this description that all of the protuberances 21 are secured to at least one of the supports 5 and 6, but some of them may be secured to only one of the supports so that a variable progression effect can be obtained, with a free space then existing between each such protuberance and that one of the supports to which it is not secured.

The friction pads 2 and 3, instead of being annular, may of course be segmental like the supports 5 and 6, with the latter being in mutual alignment so as to be coupled through the protuberances. The same is true for the radial extension portions 9 and 10. The supports 5 and 6 may constitute the clutch plate of the clutch, for example in the manner that can be seen in FIG. 7 of the above mentioned French published patent application FR 2 600 732A. These supports may also be secured to one of the guide rings of the clutch, by means of special rivets as shown in FIG. 1 of the same French publication.

The supports need not be identical to each other, for example one of them may be flat while the other has an oblique folded portion so as to bring the supports together at their inner periphery. The folded portions 33 may be of zig-zag configuration.

Finally, instead of being spaced apart regularly in alternation of one disc to the other as shown in FIG. 1, the apertures 30 may be spaced in any other suitable way, for example with one of the supports having more of these apertures than the other, or even being provided with all of the apertures.

What is claimed is:

1. A friction clutch comprising a pair of annular supports, each of which comprises a first portion, a second portion forming an inward radial extension of the first portion, and at least one folded portion formed in at least one of said second portions whereby the two supports are mounted with their said second portions in axial juxtaposition; two coaxial friction pads spaced axially apart from each other and adhesively bonded or moulded on to said first portions of said supports; and a progression element constituting a spring, interposed between said friction pads and secured to at least one of said supports, wherein said progression element comprises a plurality of protuberances of resilient material, at least some of which connect said supports together, said protuberances defining channels between them and having an outer periphery and an inner periphery each defining a respective surface, with the circumferential length of said surface of the outer periphery being larger than that at the inner periphery, wherein said folded portion formed in at least one of said second portions further includes an aperture formed therein, said aperture having a circumferential width greater in dimension than said circumferential length of said protuberance at said inner periphery of said protuberance.

2. A clutch according to claim 1, wherein said protuberances extend radially and are of trapezoidal cross section.

3. A clutch according to claim 1, wherein said protuberances are inclined circumferentially so as to define fins.

4. A clutch according to claim 1, wherein said protuberances have a circumferential thickness which reduces progressively from said outer periphery to said inner periphery.

5. A clutch according to claim 1, wherein said folded portions are formed in said second portions of both of said supports whereby the latter are bent towards each other so as to be juxtaposed along a radially inner portion thereof, said folded portions of said second portions having said apertures formed therein in line with said protuberances.

* * * * *